United States Patent
Yen

(10) Patent No.: US 7,952,884 B2
(45) Date of Patent: May 31, 2011

(54) DATA STORAGE SYSTEM HAVING ADJUSTABLE DISPLAY MODULE

(75) Inventor: Heng-Chih Yen, Chungho (TW)

(73) Assignee: Infortrend Technology Inc., Chungho (TW)

( * ) Notice: Subject to any disclaimer, the term of this patent is extended or adjusted under 35 U.S.C. 154(b) by 410 days.

(21) Appl. No.: 11/206,028

(22) Filed: Aug. 18, 2005

(65) Prior Publication Data

US 2006/0039122 A1    Feb. 23, 2006

Related U.S. Application Data

(60) Provisional application No. 60/522,141, filed on Aug. 20, 2004.

(51) Int. Cl.
*H05K 7/16* (2006.01)
*H05K 5/00* (2006.01)
*A47B 81/00* (2006.01)
*A47F 7/00* (2006.01)

(52) U.S. Cl. .................. 361/727; 361/724; 361/679.31; 312/223.2; 211/26

(58) Field of Classification Search .......... 361/681–683, 361/724–727, 685, 679.29, 679.31–679.4; 312/223.1, 223.2; 211/26; 345/156, 157, 168, 169

See application file for complete search history.

(56) References Cited

U.S. PATENT DOCUMENTS

| | | | | |
|---|---|---|---|---|
| 5,941,493 A | * | 8/1999 | Cheng | 248/371 |
| 6,088,222 A | * | 7/2000 | Schmitt et al. | 361/686 |
| 6,144,549 A | * | 11/2000 | Moss et al. | 361/681 |
| 6,498,723 B1 | * | 12/2002 | Konshak et al. | 361/685 |
| 6,580,604 B1 | * | 6/2003 | McAnally et al. | 361/685 |

* cited by examiner

*Primary Examiner* — Zachary M Pape
*Assistant Examiner* — Nidhi Desai
(74) *Attorney, Agent, or Firm* — Birch, Stewart, Kolasch & Birch, LLP

(57) ABSTRACT

A data storage system having an adjustable display module is provided. The adjustable display module is installed in the receiving space of the housing of the data storage system in a proper angular position with respect to the housing. Therefore, the display module can be adjusted flexibly to adapt to the change of the housing placement (such as placement in a vertical fashion or in a horizontal fashion) to allow users able to observe the information displayed on the display screen with a regular angle.

20 Claims, 8 Drawing Sheets

DATA STORAGE SYSTEM HAVING ADJUSTABLE DISPLAY MODULE

CROSS-REFERENCE TO RELATED APPLICATION

This application claims the priority benefit of U.S. Provisional Application Ser. No. 60/522,141, filed on Aug. 20, 2004, the full disclosures of which are incorporated herein by reference.

BACKGROUND OF THE INVENTION

1. Field of the Invention

The present invention relates to data storage system, more particularly, to a data storage system having an adjustable display module on the housing, in which the angle of the display screen of the adjustable display module can be flexibly adjusted to adapt to the change of the housing placement.

2. Description of the Related Art

A RAID (Redundant Array of Inexpensive/Independent Disks) workstation is a data storage system equipped with a plurality of disk drives configured to provide data storage space of high capacity, high performance, and/or high data availability. The prior art RAID workstation always has a display screen provided on a front panel of the housing for displaying the operation status of the RAID workstation. Since display screen is fixedly mounted on the housing, users cannot change the angular position of the display screen with respect to the housing.

In practically using, because of some varying factors, such as the located environment, the housing of the data storage system could be placed in either a vertical fashion or a horizontal fashion. If, for example, the original design is that when the housing is placed on a platform in a vertical fashion, the display screen is parallel to the level of the platform for observation, it is quite inconvenient for users to observe the display screen when the data storage system is in a horizontal placement fashion, which is a 90 degrees rotation from the vertical placement fashion. In the horizontal placement, users cannot observe the information displayed on the display screen with a regular angle.

SUMMARY OF THE INVENTION

An objective of the present invention is to provide an adjustable display module and a data storage system having the same. The angle of the display screen can be flexibly adjustable.

Another objective of the present invention is to provide an adjustable display module and a data storage system having the same, in which the angle of the display screen can be flexibly adjustable to adapt to the change of the housing placement allowing users to observe the information displayed on the display screen with a regular angle.

To achieve the objective of the above statement, a data storage system having an adjustable display module provided by the present invention includes a housing having receiving space, at least one storage device installed in the housing, and a display module installed in the receiving space of the housing having a display screen. Moreover, the angle of the display screen can be changed to adapt to the change of the housing placement.

For further understanding of the invention, reference is made to the following detailed description illustrating the embodiments and examples of the invention. The description is only for illustrating the invention and is not intended to be considered as limitation of the scope of the claimed invention.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
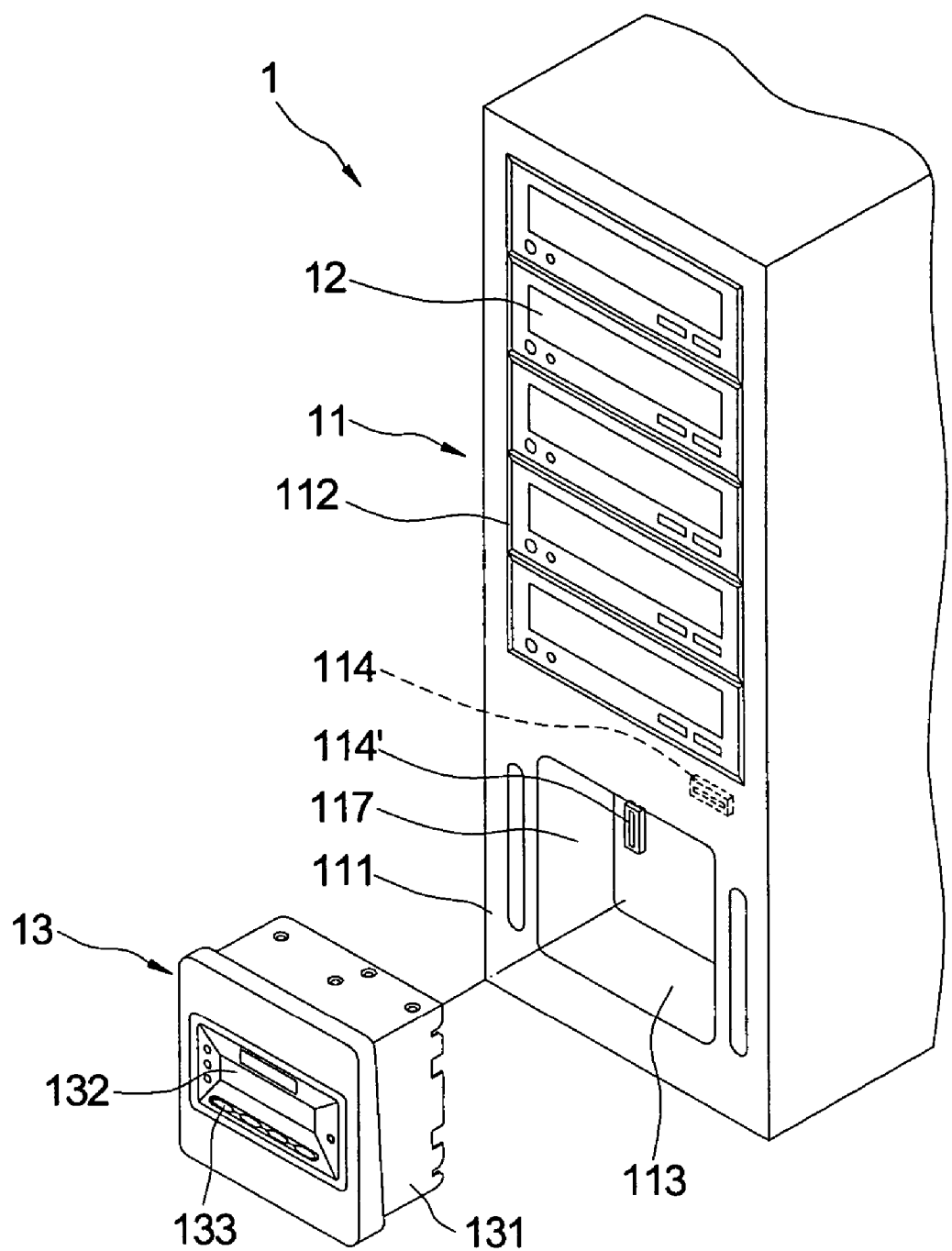
FIG. 1 is an exploded perspective view of a data storage system of the first embodiment of the present invention.
Figure 2:
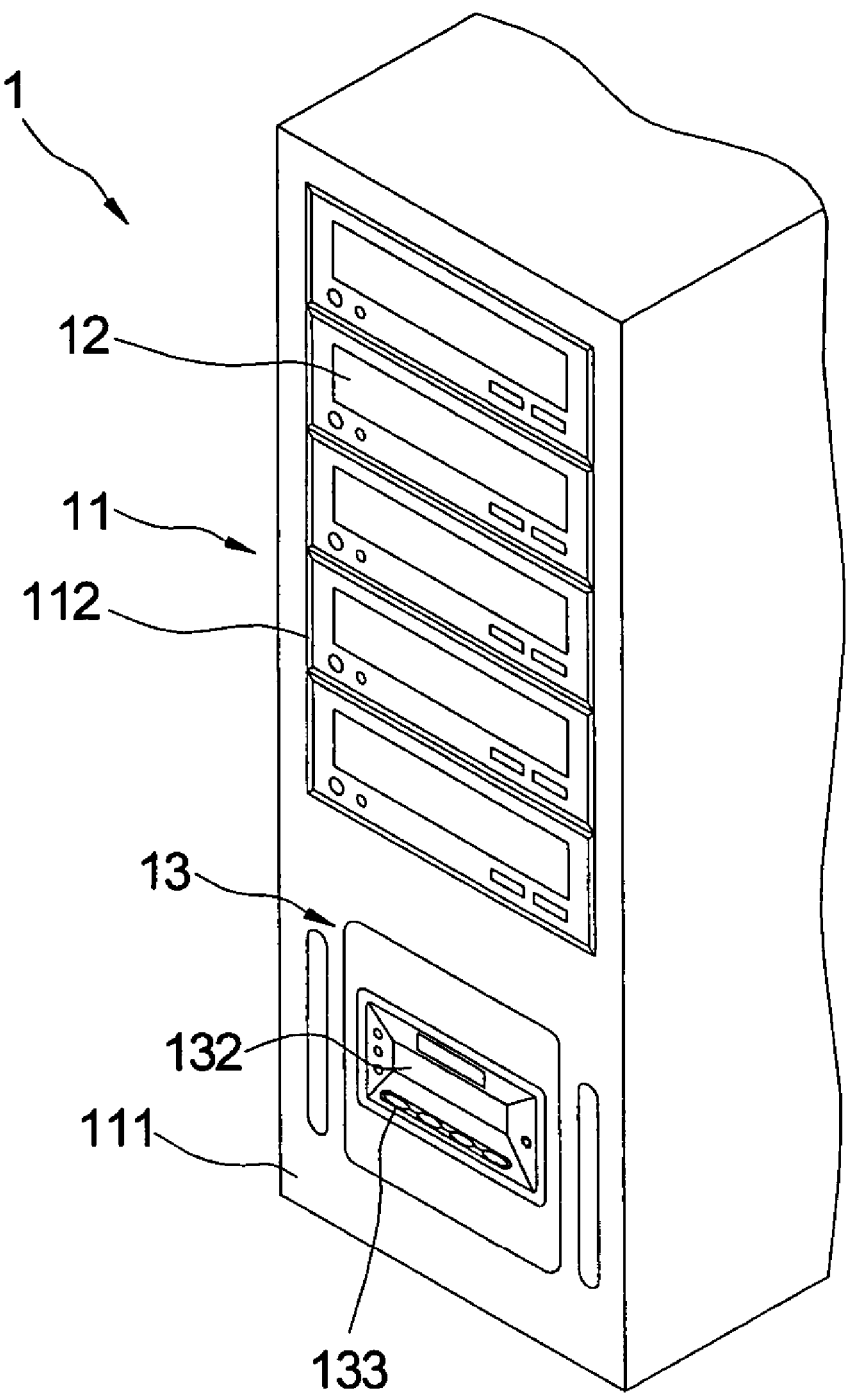
FIG. 2 is a perspective view of a data storage system of the first embodiment of the present invention.
Figure 3:
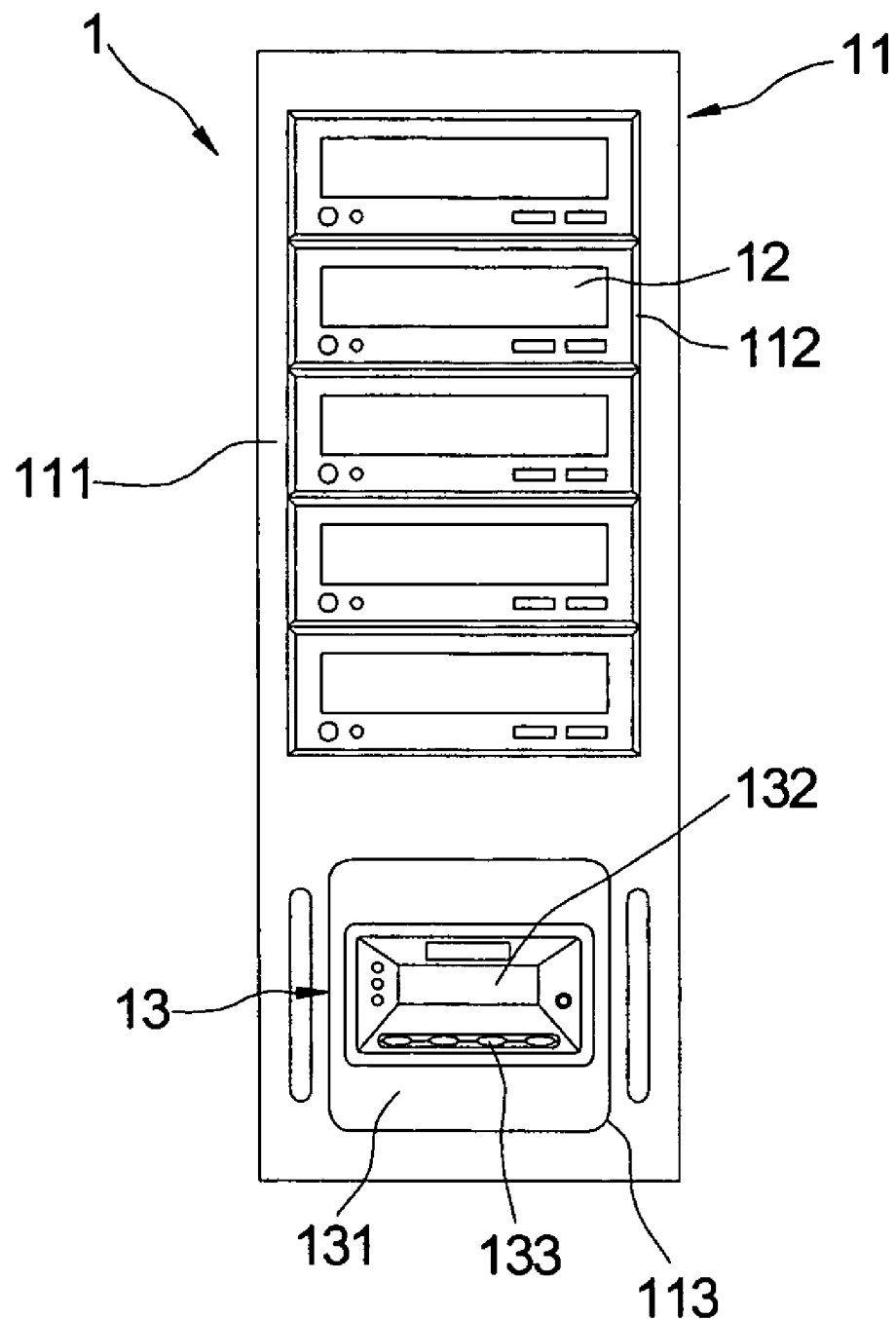
FIG. 3 is a front elevational view of a data storage system of the first embodiment of the present invention.

Please refer to FIG. 1, FIG. 2 and FIG. 3, which show the first embodiment of the present invention. FIG. 1 is an exploded perspective view of a data storage system of the first embodiment of the present invention; FIG. 2 is a perspective view of a data storage system of the first embodiment of the present invention; and FIG. 3 is a front elevational view of a data storage system of the first embodiment of the present invention. The data storage system 1 includes a housing 11, a plurality of storage device drawing boxes 12 and a display module 13. The storage device drawing boxes 12 are provided for receiving data storage devices, such as hard disk drives, and can be installed into a receiving slot 112 of the housing 11 and fixed therein from a front panel 111 of the housing 11 and in proper electrical connection with an internal circuit unit of the data storage system 1 provided in the housing 11. In the present embodiment, the storage device drawing boxes 12 are piled up in a vertical stack.

In the present embodiment, a receiving space 113 is provided in the housing 11 from a square aperture 117 formed on the front panel 111 and extends inward there from an appropriate depth for containing the display module 13. Two first connection units 114, 114' are provided in the receiving space 113 of the housing 11 with an angular position difference of 90 degrees with respect to each other and are in proper electrical connection with a circuit unit in the housing 11.

Figure 4:
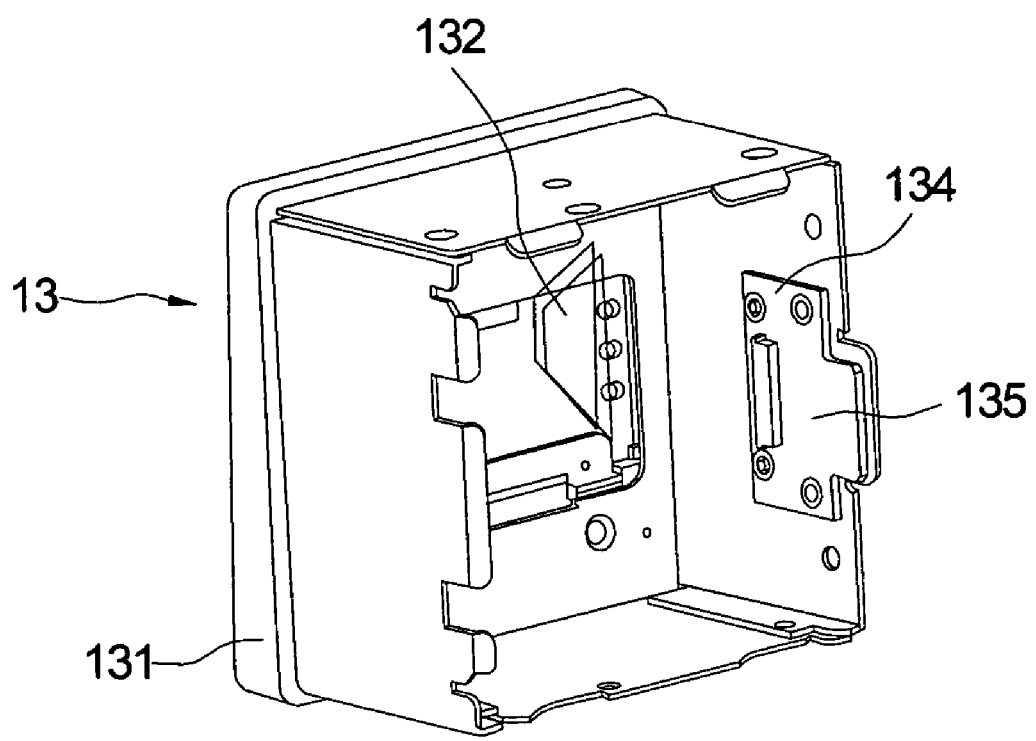
FIG. 4 is a perspective view of a display module of the first embodiment of the present invention.

The display module 13 has a casing 131, a front face of which is square to correspond to shape of the aperture 117 of the housing 11 in the present embodiment. A display screen 132 is provided in the center of the front face of the casing 131 for showing information regarding the data storage system 1. A set of keys 133 is provided below the display screen 132 for configuring the data storage system 1. A circuit board 134 is provided in an inner side wall of the casing 131 and in electrical connection with the display screen 132 (shown in FIG. 4). A second connection unit 135 is provided on the circuit board 134 for electrically connecting to one of the first connection units 114, 114'. The first connection units 114, 114' and the second connection units 135 are mating connection devices, which can be electrical connectors or connecting circuit boards.

The display module 13 is removably installed in the receiving space 113 of the housing 11 and the casing 131 of the display module 13 can be fixed in the receiving space 113 properly. The second connection unit 135 is able to mate with the first connection unit 114' to achieve the electrical connection between the display module 13 and the internal circuit unit of the data storage system 1 in the housing 11.

Figure 5:
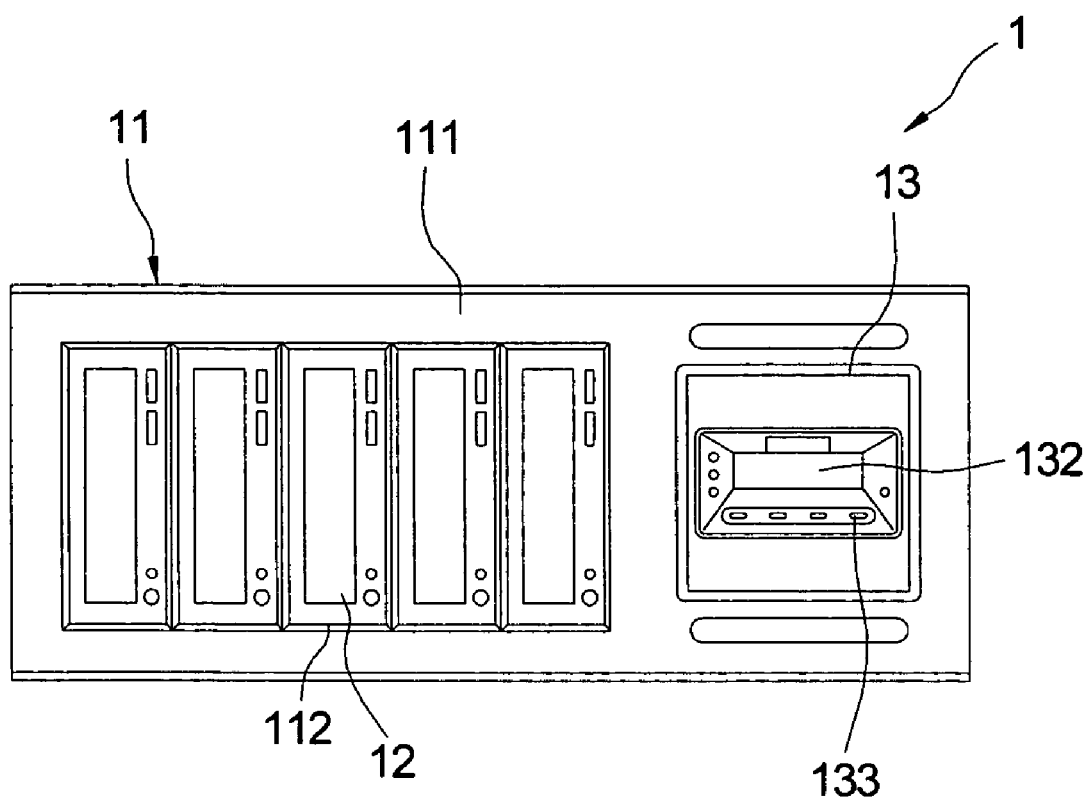
FIG. 5 is a front elevational view showing another operational status of a data storage system of the first embodiment of the present invention.

When the housing 11 of the data storage system 1 is placed in a vertical fashion, the display screen 132 of the display module 13 is level, as shown in FIG. 3, and it is the angle for regular observation of the information displayed on the display screen. When the housing 11 of the data storage system 1 is placed in a horizontal fashion, the whole display module 13 can be drawn out and rotated 90 degrees clockwise to change the observation angle of the display screen 132 to be level and then installed back again (shown in FIG. 5) to maintain the display screen 132 in the regular observation angle. When the display module 13 is rotated 90 degrees, the second connection unit 135 is also rotated with the display module 13 to correspond to another first connection unit 114. Thereby, the second connection unit 135 can connect with the first connection unit 114 to ensure that the display module 13 is still electrically connected to the circuit unit in the housing 11.

Figure 6:
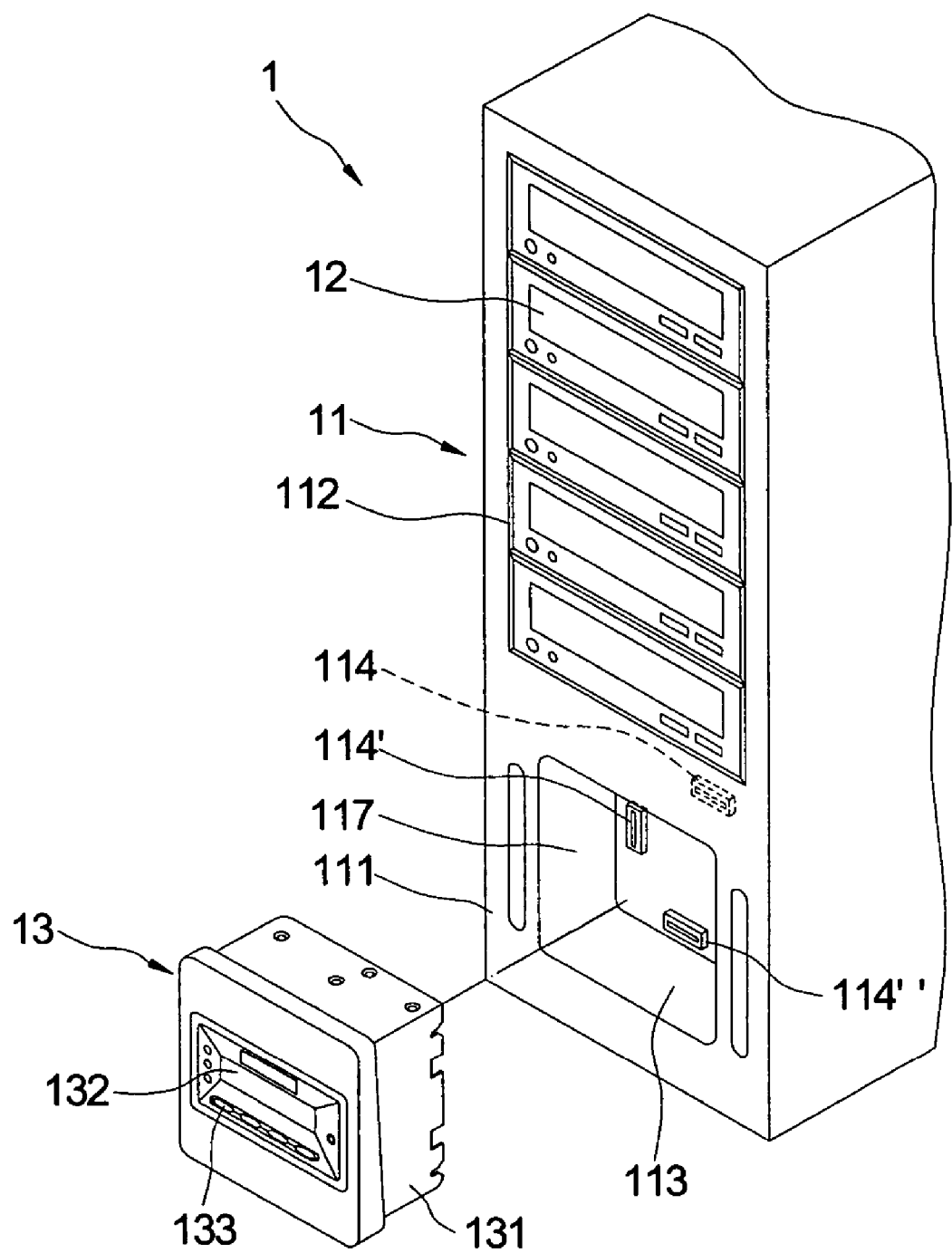
FIG. 6 is a perspective view of a data storage system of the second embodiment of the present invention.

FIG. 6 shows a perspective view of a data storage system of the second embodiment of the present invention in which three first connection units 114 and 114' and 114" are in the receiving space 113 of the housing 11 with every two adjacent first connection units provided with an angular position difference of 90 degrees with respect to each other. So, when the housing 11 of the data storage system 1 is placed in another fashion, a second horizontal fashion opposite to that in the first embodiment, the whole display module 13 can be drawn out and rotated 90 degrees in the other direction (counterclockwise) to change the observation angle of the display screen 132 to be level and then installed back into the housing 11 again. When the display module 13 is rotated 90 degrees in the other direction (counterclockwise), the second connection unit 135 is also rotated with the display module 13 to correspond to another first connection unit 114". As such, the second connection unit 135 can connect with the first connection unit 114" to ensure that the display module 13 is still electrically connected to the internal circuit unit of the data storage system 1 in the housing 11. By the above method, in addition to the original vertical fashion, the housing 11 of the data storage system 1 can be placed in another two opposite-directed horizontal fashions.

Alternatively, when there are first connection units provided on each side of the receiving space 113 of the housing 11 and every adjacent two of those four first connection units are provided with an angular position difference of 90 degrees with respect to each other, the housing 11 of the data storage system 1 supports two opposite-directed vertical fashions and two opposite-directed horizontal fashions. The whole display module can be drawn out, rotated corresponding to the placement fashion of the housing 11 and then inserted back into the housing again to achieve the effect that the display screen of display module can be maintained to be level to adapt to the change of the housing placement.

In the above embodiments, the main approach is to provide a display module which has a second connection unit and to provide in the housing a plurality of first connection units in the receiving space corresponding to the display module such that the display module can be adjustably received in different angles with respect to the housing according to the different fashions of the housing placement to maintain the display screen of the said display module to be level to be observed conveniently by users and meanwhile the said second connection unit can always have a corresponding first connection unit to be connected with.

Although in the above embodiments, the display module has a single second connection unit and a plurality of the first connection units provided in the receiving space of the housing that corresponds to the second connection unit, in other embodiments, the equivalent function can be accomplished by providing a first connection unit in the receiving space of the housing and a plurality of second connection units on at least two side walls of the display module corresponding to the first connection unit.

Figure 7:
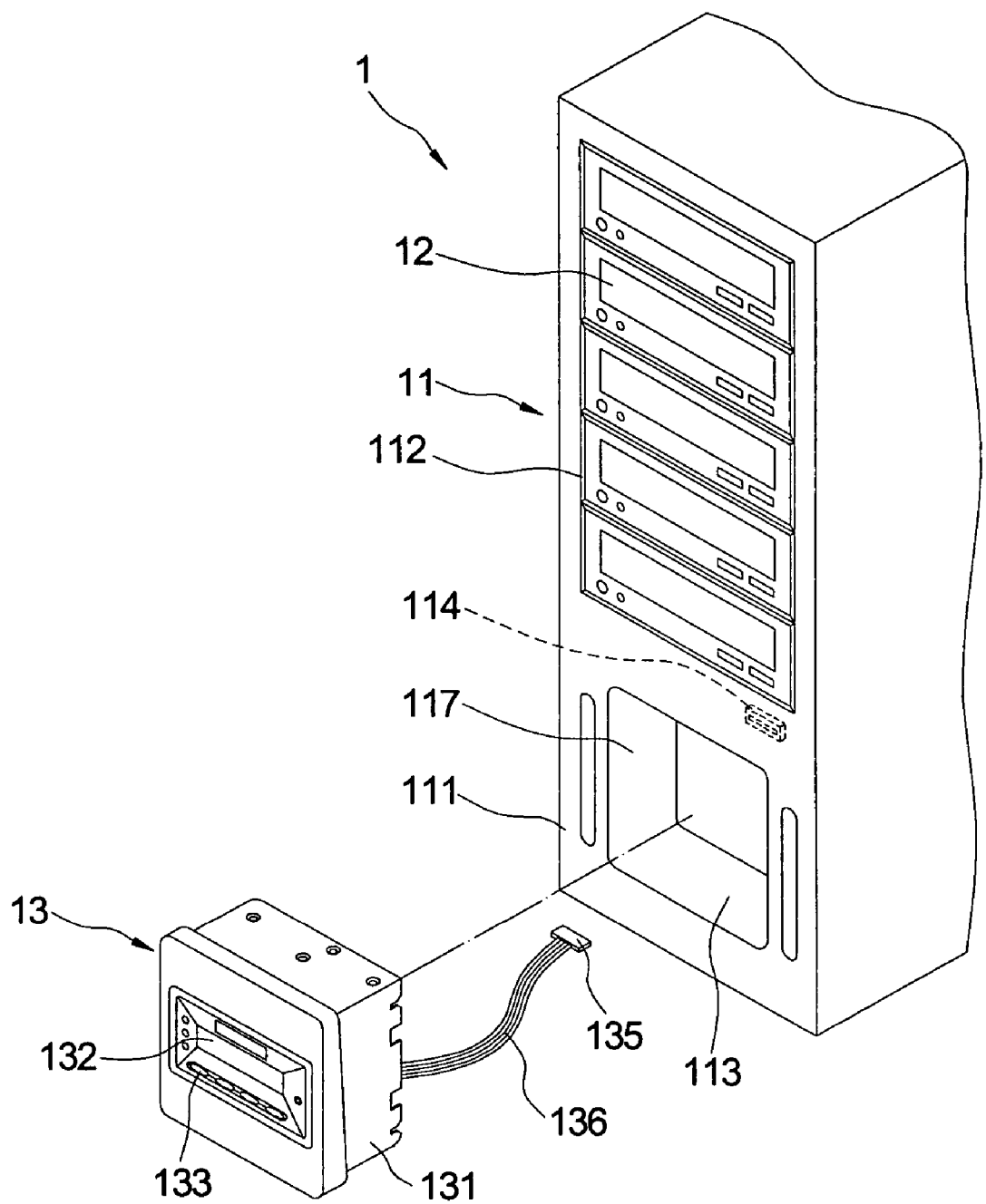
FIG. 7 is a perspective view of a data storage system of the third embodiment of the present invention.

FIG. 7 shows a perspective view of a data storage system of the third embodiment of the present invention. There is only one first connection unit 114 located in the receiving space 113 of the housing 11. The first connection unit 114 electrically connects to an internal circuit unit of the data storage system 1 in the housing 11. The circuit board 134 of the display module 13 connects with the second connection unit 135 via a flexible connection wire 136. The flexible connection wire 136 has a length long enough to properly connect the second connection unit 135 to the first connection unit 114, and no matter how the housing 11 of the data storage system 1 is placed, either in vertical or horizontal fashion, the display module 13 can be drawn out, rotated for adjusting its angle, and then inserted back into the housing 11 again and the second connection unit 135 always can smoothly connect to the first connection unit 114 to ensure that the display module 13 is electrically connected to the internal circuit unit of the data storage system 1 in the housing 11 both before and after the adjustment.

Moreover, in the present embodiment, the flexible connection wire 136 can directly electrically connect with the first connection unit 114. Alternatively, the flexible connection wire 136 can directly electrically connect with the internal circuit unit of the data storage system 1 in the housing 11.

However, except to the square structure that is applied both to the receiving space of the housing and the corresponding casing of the display module in the foregoing embodiments, any symmetrical shape, such as a regular polygon or a circle can also be applied. In addition, though in the previous embodiments, the placements illustrated for the display module to be adapted are only in vertical and horizontal fashions, the present invention can be adapted to housing placements of other fashions that are not vertical and horizontal. Furthermore, the present invention can be used in a situation that the display module is adjustable with respect to the housing in the angular position and the display screen is not necessary level after the adjustment.

Figure 8:
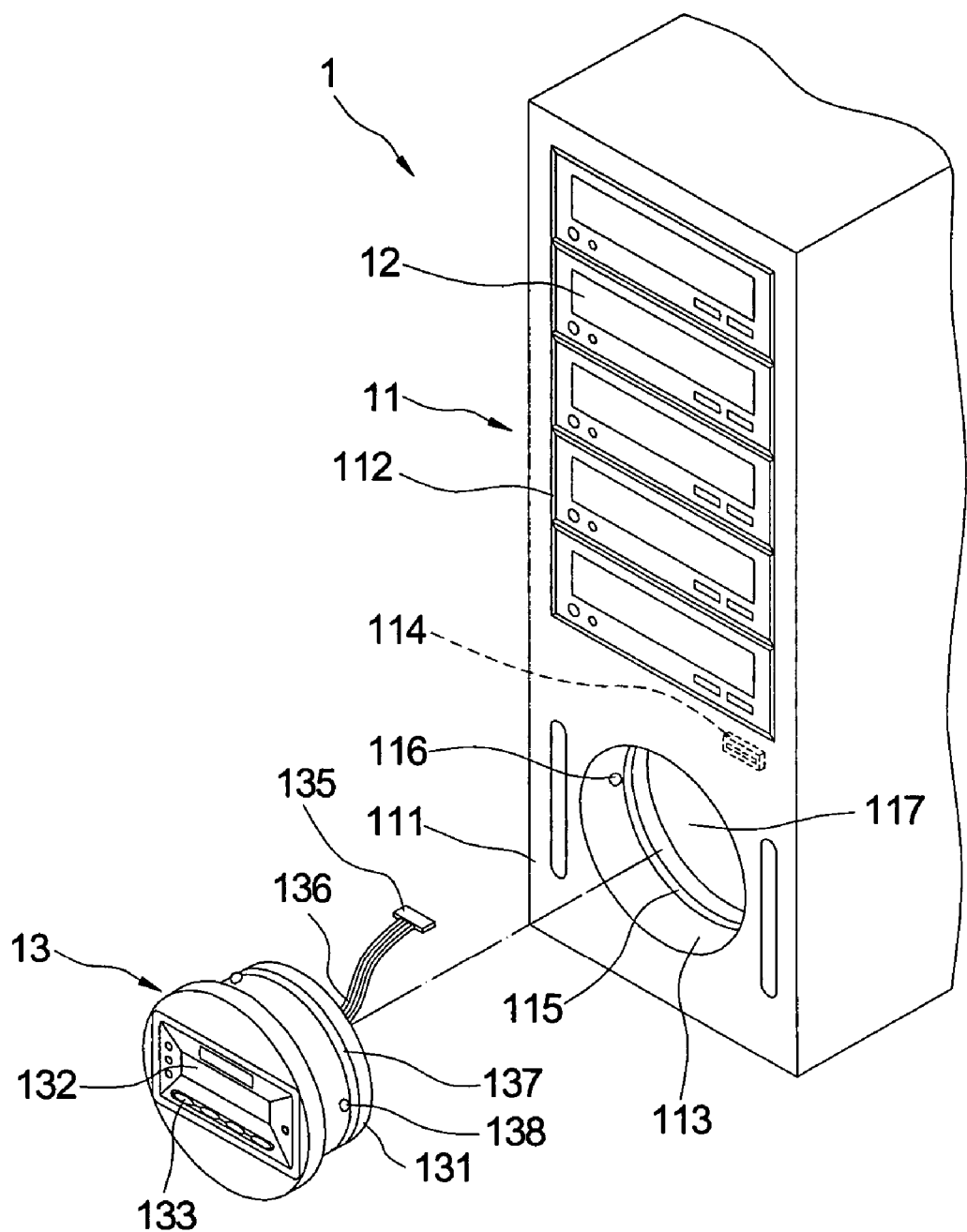
FIG. 8 is a perspective view of a data storage system of the fourth embodiment of the present invention.

FIG. 8 shows a perspective view of a data storage system of the fourth embodiment of the present invention. The shape of the front face of the display module 13 and the aperture 117 of the housing 11 are circular and mate each other. The display module 13 doesn't need to be drawn out and can be directly rotated for adjustment of the angle with respect to the housing 11. Furthermore, the electrical connection between the display module 13 and the internal circuit unit of the data storage system 1 in the housing 11 can be achieved by various means, such as the connection wire, or the electrical connection units described in the previous embodiments.

A guiding mechanism is provided between the display module 13 and the housing 11 to guide a smooth rotation of the display module 13 with respect to the housing 11. The guiding mechanism includes a guiding track 137 encircling an outer rim of the casing 131 of the display module 13 and a guiding groove 115 provided in the receiving space 113 of the housing 11, either adjacent to or inward of the aperture 117, for glidingly engaging the guiding track 137 when the display module 13 is installed in the housing 11. The display module 13 can be rotated smoothly and stably via the gliding engagement between the guiding track 137 and the guiding groove 115.

Furthermore, a positioning mechanism is provided between the display module 13 and the housing 11 for fixing the display module 13. The positioning mechanism includes a plurality of positioning protrusions 138 provided in the outer rim of the casing 131 of the display module 13 and a plurality of positioning recesses 116 provided in the receiving space 113 of the housing 11. The positioning protrusions 138 are provided 90 degrees apart around the casing 131 and the positioning recesses 116 are provided 90 degrees apart around the receiving space 113 and correspond to the position of the positioning protrusions 138. By engaging the positioning protrusions 138 to the positioning recesses 116 the display module 13 can be fixed to the housing 11 in a suitable angular position without any unsuitable rotation.

The display module 13 of the present invention is adjustably provided on the housing 11. Therefore, the angle of the display screen 132 of the display module 13 with respect to the housing 11 can be flexibly adjusted to adapt to the change of the placement of the housing 11 of the data storage system 1. Regardless of how the placement of the housing 11 of the data storage system 1 is changed, users can observe the information displayed on the display screen 132 with a regular angle.

Additionally, except to the data storage system 1, the display module 13 of the present invention also can be applied to other kinds of electronic apparatuses.

The description above only illustrates specific embodiments and examples of the present invention, and is not intended to limit the scope of the present invention. The present invention should therefore cover various modifications and variations made to the herein-described structure and operations of the invention, provided they fall within the scope of the invention as defined in the following appended claims.

What is claimed is:

1. A data storage system, comprising:
   a housing having a receiving space;
   at least one storage device, installed in the housing; and
   a display module having a display screen, wherein the display module is removably installed in the receiving space and wherein when a placement angular position of the housing is changed, an installation angular position of the display module with respect to the housing is adjusted to display information at a regular observation angle, without detaching other electronic device from the housing and without adjusting an installation angular position of said other electronic device in the housing with respect to the housing,
   in which the step of adjusting the installation angular position of the display module further comprises the steps of:
   moving the display module out of the receiving space along an axis extending in a moving direction of the display module;
   rotating the display module around the axis until reaching the regular observation angle; and
   reinserting the display module into the receiving space along the axis.

2. The data storage system of claim 1, wherein the display module comprising a casing, the display screen is provided on a front side of the casing and electrically connected to an internal circuit unit of the data storage system in the housing.

3. The data storage system of claim 2, wherein the display screen is electrically connected to the internal circuit unit via a flexible connection wire.

4. The data storage system of claim 2, wherein a shape of the casing of the display module is a regular polygon.

5. The data storage system of claim 2, wherein an aperture of the housing for communicating the receiving space to outside is a regular polygon.

6. The data storage system of claim 4, wherein the regular polygon is a square.

7. The data storage system of claim 2, wherein a shape of the casing of the display module is circular.

8. The data storage system of claim 2, wherein an aperture of the housing for communicating the receiving space to outside is circular.

9. The data storage system of claim 7, wherein a guiding mechanism is provided between the display module and the housing for guiding rotation of the display module.

10. The data storage system of claim 7, wherein a positioning mechanism is provided between the display module and the housing for positioning the display module.

11. The data storage system of claim 2, wherein a first connection unit is provided in the housing and electrically connected to the internal circuit unit therein, and a second connection unit is provided in the casing and electrically connected to the display screen, the first connection unit and the second connection unit being electrically connected to each other.

12. The data storage system of claim 11, wherein the second connection unit is provided on a circuit board of the display module.

13. The data storage system of claim 11, wherein a plurality of the first connection units are provided in the housing for connecting to the second connection units and every adjacent two of the plurality of the first connection units are provided with an angular position difference of 90 degrees with respect to each other.

14. The data storage system of claim 11, wherein a plurality of the second connection units are provided with the display module for connecting to the first connection units and every adjacent two of the plurality of the second connection units are provided with an angular position difference of 90 degrees with respect to each other.

15. The data storage system of claim 11, wherein the first connection unit and second connection unit are electrical connectors.

16. The data storage system of claim 11, wherein the first connection unit and second connection unit are connecting circuit boards.

17. The data storage system of claim 11, wherein a shape of a front side of the casing of the display module and an aperture of the housing for communicating the receiving space to outside are both regular polygon.

18. The data storage system of claim 11, wherein a shape of the casing of the display module and an aperture of the housing for communicating the receiving space to outside are both circular.

19. The data storage system of claim 18, wherein a guiding mechanism is provided between the display module and the housing for guiding the rotation of the display module.

20. The data storage system of claim 18, wherein a positioning mechanism is provided between the display module and the housing for positioning the display module.

* * * * *